United States Patent [19]
Kroeker et al.

[11] Patent Number: 5,789,878
[45] Date of Patent: Aug. 4, 1998

[54] DUAL PLANE ROBOT

[75] Inventors: Tony Kroeker, Georgetown; Ben Mooring, Austin, both of Tex.

[73] Assignee: Applied Materials, Inc., Santa Clara, Calif.

[21] Appl. No.: 679,868

[22] Filed: Jul. 15, 1996

[51] Int. Cl.[6] .......................... B25J 18/00; B65G 49/07
[52] U.S. Cl. .................. 318/45; 901/14; 901/23; 464/29; 74/490.03; 318/625
[58] Field of Search .................. 318/15, 45, 568.11, 318/625; 901/14, 15, 23, 24, 25; 464/29; 74/490.01, 490.03, 490.05; 414/222, 225, 744.1, 744.4, 744.5, 744.6, 749, 750, 751, 917

[56] References Cited

U.S. PATENT DOCUMENTS

| | | |
|---|---|---|
| 4,712,971 | 12/1987 | Flyer . |
| 4,897,015 | 1/1990 | Abbe et al. . |
| 4,990,047 | 2/1991 | Wagner et al. ............ 414/217 |
| 5,102,280 | 4/1992 | Poduje et al. . |
| 5,227,708 | 7/1993 | Lowrance .................. 318/640 |
| 5,324,155 | 6/1994 | Goodwin et al. . |
| 5,522,275 | 6/1996 | Mauletti . |

Primary Examiner—Bentsu Ro
Attorney, Agent, or Firm—Patterson & Streets, L.L.P.

[57] ABSTRACT

The present invention provides a robot assembly for transferring objects, namely substrates, through a process system. A robot linkage is provided to a multi-plane, multi-arm robot assembly driven by two motors. In one embodiment, a linkage is provided which is driven by two magnetic retaining rings. In another embodiment, a linkage is provided which is driven by three magnetic retaining rings, two of which are coupled to the same motor. Both embodiments enable a substrate shuttle operation to be performed wherein a pair of substrates can be shuttled into and out of a selected chamber without having the robot assembly rotate in the transfer and by actuation of only two motors.

45 Claims, 9 Drawing Sheets

DUAL PLANE ROBOT

BACKGROUND OF THE INVENTION

1. Field of the Invention

The present invention relates to an apparatus for transferring objects in integrated circuit production and relates more particularly to a multi-blade, multi-plane robot for transferring substrates through a process system while reducing the time in which a process chamber is idle.

2. Background of the Related Art

The advantages of using robots in the production of integrated circuits to transfer substrates throughout a processing system are well established. Current practice includes the use of robot arms to move substrates from a loading port into various process chambers within a multiple chamber processing system. The robot arms can then retrieve a substrate from a particular processing chamber and shuttle the substrate into another chamber for additional processing. When substrate processing is complete, the robot arm returns the substrate to the loading port and another substrate is moved into the system by the robot for processing. Typically, several substrates are handled in this manner during each process run, and several substrates are passed through the system during a single process cycle.

In multiple chamber process systems, it is desirable to increase the substrate throughput of the system by concurrently processing substrates in each of the chambers. A typical substrate handling sequence used in multiple chamber process systems includes removing a substrate from a process chamber, storing the substrate in a selected location, and then moving a new substrate from a storage location into the processing chamber from which the first substrate was removed. Although this sequence improves use of the system and provides improved throughput, the robot arm itself must go through significant repetitive motion to simply exchange substrates within a selected processing chamber.

To increase the efficiency of substrate handling, a robot arm having the ability to handle two substrates at the same time may be provided. For example, one such robot includes two carrier arms which are located at opposed ends of a support, and the support is rotated about a pivot. One wafer may be stored on one arm while the other arm is used to retrieve and place a second wafer. The arms are then rotated and the stored wafer may be placed as desired. Such mechanism does not allow the two arms to be present in the same process chamber at the same time, nor does it allow for the immediate replacement of a fresh wafer in a process chamber after a processed wafer is removed, because the support must be rotated 180° to place the wafer on the second arm in a position for loading into the location from which the first wafer was removed. Likewise, simultaneous use of the two arms for placement or removal of wafers from a process or storage position is not possible with this configuration.

Another robot configuration includes a central hub having two opposed arms, each arm arranged for rotation relative to the hub while arcuately fixed in relation to one another. A blade is linked to the free ends of the arms, and a drive is provided for rotating the arms in opposite directions from each other to extend the blade radially from the central hub, and in the same direction to effect a circular movement of the blade about the central hub. Preferably, a second pair of arms extend opposed from the first pair, on the ends of which is connected a second blade. Opposed rotation of the arms in one direction extends the first arm while retracting the second arm. Opposed rotation of the arms in the opposite direction results in retraction of the first arm and extension of the second arm. Simultaneous motion of the arms in the same direction swings the blades in a circular or orbital path around the hub. The use of two blades increases throughput, however, this device still does not permit simultaneous insertion of a fresh wafer into a process chamber as a processed wafer is being withdrawn from the same chamber. Rather, the support must still be rotated 180° to place the wafer on the second arm in a position for loading into the location from which the first wafer was removed.

In an attempt to further increase throughput and decrease chamber idle time associated with wafer transfer, another robot configuration includes two robot assemblies having at least coaxially upper and lower robots which can operate independently to remove a first wafer from a processing chamber and insert a fresh wafer into the same processing chamber without having to rotate and retrieve the fresh wafer. One such assembly is disclosed in U.S. patent application Ser. No. 08/608,237, entitled "Multiple Independent Robot Assembly and Apparatus for Processing and Transferring Semiconductor Wafers," filed Feb. 28, 1996 and commonly assigned to Applied Materials, Inc. The upper robot operates independently of the lower robot to obtain improved throughput and increased wafer handling capacity of the robot assembly as compared to the opposed, single plane, dual blade robots. The upper robot is typically stacked above the lower robot and the two robots may be mounted concentrically to allow fast wafer transfer. Either robot can be either a single blade robot or dual blade robot.

However, in order to achieve independent operation of the two robots, the assemblies require at least four magnetic or mechanical linkages and the same number of drive motors to maneuver the robot blades within the x-y plane. Compared to a conventional robot assembly, this dual robot configuration is considerably more complex, more expensive to build and maintain, and requires more space, typically above and below the transfer chamber.

The use of upper and lower blades having independent rotation to enable sequential transfer of a processed substrate out of a processing chamber and a fresh wafer into the processing chamber has great advantage. As an example, a typical processing chamber is idle during the period of time during which a first wafer is removed from the chamber and the robot assembly is rotated to insert a second wafer into the chamber. Dual plane blades which can perform a shuttle operation significantly decrease the amount of time in which the chamber is not operational. In addition, the time that the slit valve must remain open while the robot transfers a first wafer out of the chamber and inserts a second wafer into the chamber is also decreased. As a result, the throughput of the chamber can be significantly increased and the period of time in which particles present outside the chamber may enter into the chamber can be significantly decreased.

However, there remains a need for a robot which can shuttle substrates through a process system and which provides multi-plane robot arms which can be actuated by a minimal number of motors. There is also a need for a robot that reduces the amount of idle time that a chamber experiences during removal of a first wafer and insertion of a second wafer and also reduces the amount of time that a slit valve needs to be opened during this sequence.

SUMMARY OF THE INVENTION

The present invention provides an apparatus for transferring objects. The apparatus comprises a first motor coupled to a first rotatable member that is rotatable about an axis of rotational symmetry; a second motor coupled to a second rotatable member that is rotatable about an axis of rotational symmetry; a plurality of blades vertically spaced from one another; and a linkage to enable coordinated movement of the blades on rotation of the first and second rotatable members. In one embodiment, the coordinated movement of the blades includes simultaneous extension and retraction. Rotation of the first and second rotatable members in the same direction provides rotation of the blades and the rotation in the opposite direction provides extension of the one blade and retraction of the other blade.

The invention also provides an apparatus for transferring objects between multiple positions, comprising: a first arm assembly positioned on a first plane; a second arm assembly positioned on a second plane; and a drive member coupled to both the first and second arm assemblies to actuate each arm assembly. The first and second arm assemblies are actuated by rotation of two or three coaxially aligned hubs connected to two motors.

The invention further provides a method for transferring objects between a plurality of positions within an enclosure, comprising the steps of: providing a first object transfer assembly having an object support occupying a first plane and positionable at multiple positions about an axis of rotation; providing a second object transfer assembly having an object support occupying a second plane and positionable at multiple positions about the axis of rotation; coaxially positioning the first and the second object transfer assemblies about the axis of rotation; and moving the first and second object transfer assemblies by rotating a plurality of hubs with a drive assembly.

The invention also includes an apparatus for transferring an object through an enclosure, comprising: a first extendable arm assembly comprising a first drive arm movable about a central axis, a second drive arm movable about the central axis, a pair of strut arms movably connected to the first and second drive arms, a substrate transfer blade pivotally coupled to the pair of strut arms; a second extendable arm assembly comprising a third drive arm movable about the central axis, a fourth drive arm movable about the central axis, a pair of strut arms movably connected to the third and fourth drive arms, and a substrate transfer blade pivotally coupled to the pair of strut arms; and a drive assembly coupled to the first and second extendable arm assemblies to provide rotational and translational motion to the arm assemblies.

The invention further includes a robot linkage to impart rotational and linear motion to at least two multi-plane transfer blades, comprising: first and second drive arms coupled to a first blade by a pair of strut arms; third and fourth drive arms coupled to a second blade by a second pair of strut arms; and first and second drive hubs coupled to the drive arms to impart rotational and linear motion to the first and second blades. The robot may further comprising a third hub to impart rotational and linear motion to the first and second blades.

The present invention also provides a multi-chamber process system, comprising: a load lock; at least one transfer chamber connected to the load lock; a plurality of process chambers connected to at least one transfer chamber; and a robot comprising: a first motor coupled to a first rotatable member that is rotatable about an axis; a second motor coupled to a second rotatable member that is rotatable about an axis; and a plurality of object supports vertically spaced from one another, and is a linkage to enable coordinated movement of the blades on rotation of the first and second rotatable members.

BRIEF DESCRIPTION OF THE DRAWINGS

So that the manner in which the above recited features, advantages and objects of the present invention are attained can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The present invention generally provides a multi-blade, multi-plane, robot assembly useful for transferring objects between process chambers with increased throughput of objects. In one aspect of the invention, a mechanical linkage is provided to enable multi-plane robot blades to cooperate in a substrate shuttle operation to remove one substrate from a process chamber and immediately introduce a fresh substrate into the chamber, thereby decreasing the chamber idle time associated with substrate transfer which typically requires rotation of the robot assembly. The mechanical linkage preferably couple rotary output from only two motors to rotational and translational motion of multiple transfer blades located on different planes within the process system. Preferably, magnetic coupling of two motors provides two degrees of freedom to the assembly, thereby providing a simplified robot assembly requiring fewer moving parts and less cumbersome equipment. In another aspect of the invention, a method for performing a substrate shuttle operation is provided which can be accomplished with a robot having only two degrees of freedom.

Figure 1:
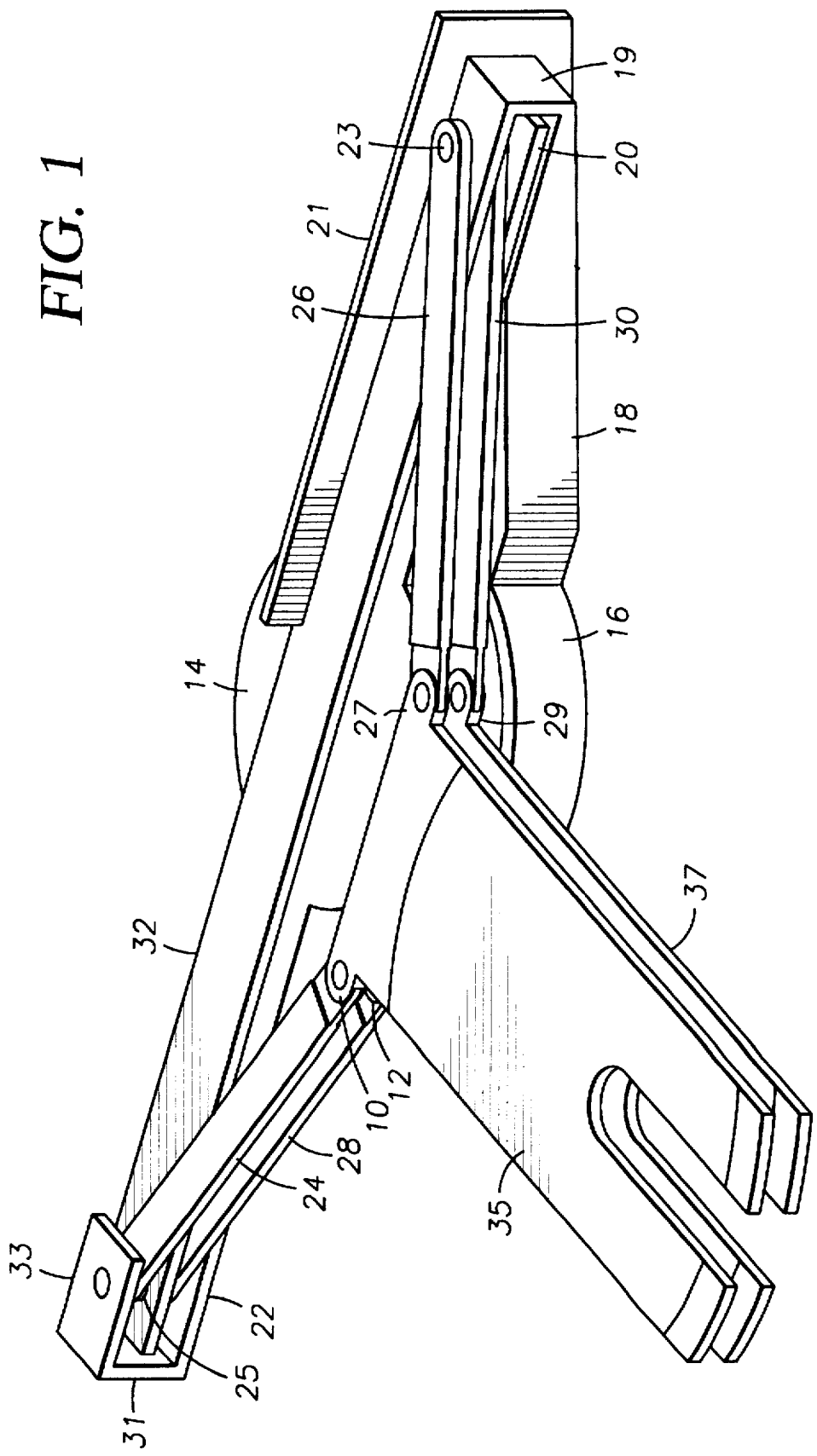
FIG. 1 is a substantially top perspective view of one embodiment of the present invention showing the robot arms in a retracted position.

Referring to FIG. 1, a substantially top perspective view of a multi-arm, multi-plane robot linkage is shown. Dual robot arms, upper arm 10 and lower arm 12, are shown in a retracted position ready for rotation within a transfer chamber or for extension of one of the arms 10, 12 into a selected chamber. Upper and lower magnetic retaining rings 14, 16 drive the robot linkage in this embodiment to actuate the substrate support blades 35,37 and the robot wrists 27, 29 which form an integral part of the robot arms 10, 12. The movement imparted to the magnetic retaining rings 14, 16 is preferably accomplished through magnetic coupling which is described in detail in U.S. Pat. No. 5,227,708, entitled "Two-Axis Magnetically Coupled Robot", issued on Jul. 13, 1993, which is hereby incorporated in its entirety by reference. Generally, actuation of the robot arms 10, 12 is provided by the rotation of the magnetic retaining rings 14, 16 which is achieved through magnetic coupling of rotary motion of actuators located outside of the vacuum environment across a thin wall of the transfer chamber to the magnetic retaining rings 14, 16. Rotation of the magnetic retaining rings 14, 16 in the same direction rotates the robot assembly within the transfer chamber. Rotation of the magnetic retaining rings in opposite directions extends one of the robot arms 10 or 12 depending on the direction of rotation of the magnetic retaining rings. Rotation of the magnetic retaining rings in the opposite direction extends the other robot arm 10 or 12. Actuation of the robot arms in this manner is known in the art. The aspects of this invention which depart from that which is already known in the art will be described in detail below.

Referring again to FIG. 1, three cantilevered arms 18, 20, 22 extend from two magnetic retaining rings 14, 16 to support struts 24, 26, 28, and 30, wrists 27, 29 and dual plane substrate support blades 27, 29 to form robot arms 10, 12. Cantilevered arm 18 extends radially from the lower magnetic retaining ring 16 and includes an upwardly extending end portion 19 which supports transverse strut 32 above the concentric magnetic retaining rings 14, 16. Transverse strut 32 is pivotally connected to strut 28 on its lower surface at pivot 25 and to strut 26 on its upper surface at pivot 23. The thickness of transverse strut 32 determines the spacing between the blades 27, 29 and is preferably minimized. The pivots 23, 25 are preferably substantially equally spaced from the axis of rotation of the concentric magnetic retaining rings 14, 16. The equal spacing of pivots 23, 25, while using struts 24, 26 having equal length, allow substantially equal extension of each of the struts 24, 26 connected thereto on rotation of the magnetic retaining rings 14, 16. However, it is understood that certain configurations may exist where extension of the struts are not at equal distances such that different angular displacements of the blades is permitted.

Cantilevered arm 20 extends radially from magnetic retaining ring 14 and is vertically disposed between cantilevered arm 18 and transverse strut 32, inwardly of the end portion 19. Strut 30 is pivotally coupled at one end to the upper surface of cantilevered arm 20 at a pivot which is located an equal distance from the axis of rotation of the magnetic retaining rings as the pivots 23, 25. Struts 28 and 30 are thereby located in coplanar relationship with one another.

Cantilevered arm 22 extends radially from magnetic retaining ring 14 opposite cantilevered arms 18, 32 and includes an upwardly extending end portion 31 on which an inwardly extending strut mounting portion 33 is supported. Strut 24 is pivotally connected at one end to the lower surface of the mounting portion 33 and at the other end to wrist 27 such that strut 24 is positioned in a coplanar relationship with strut 26 supported on the upper surface of transverse strut 32. Therefore, the struts 24, 26 are coplanar, as are the struts 28, 30.

Figure 9:
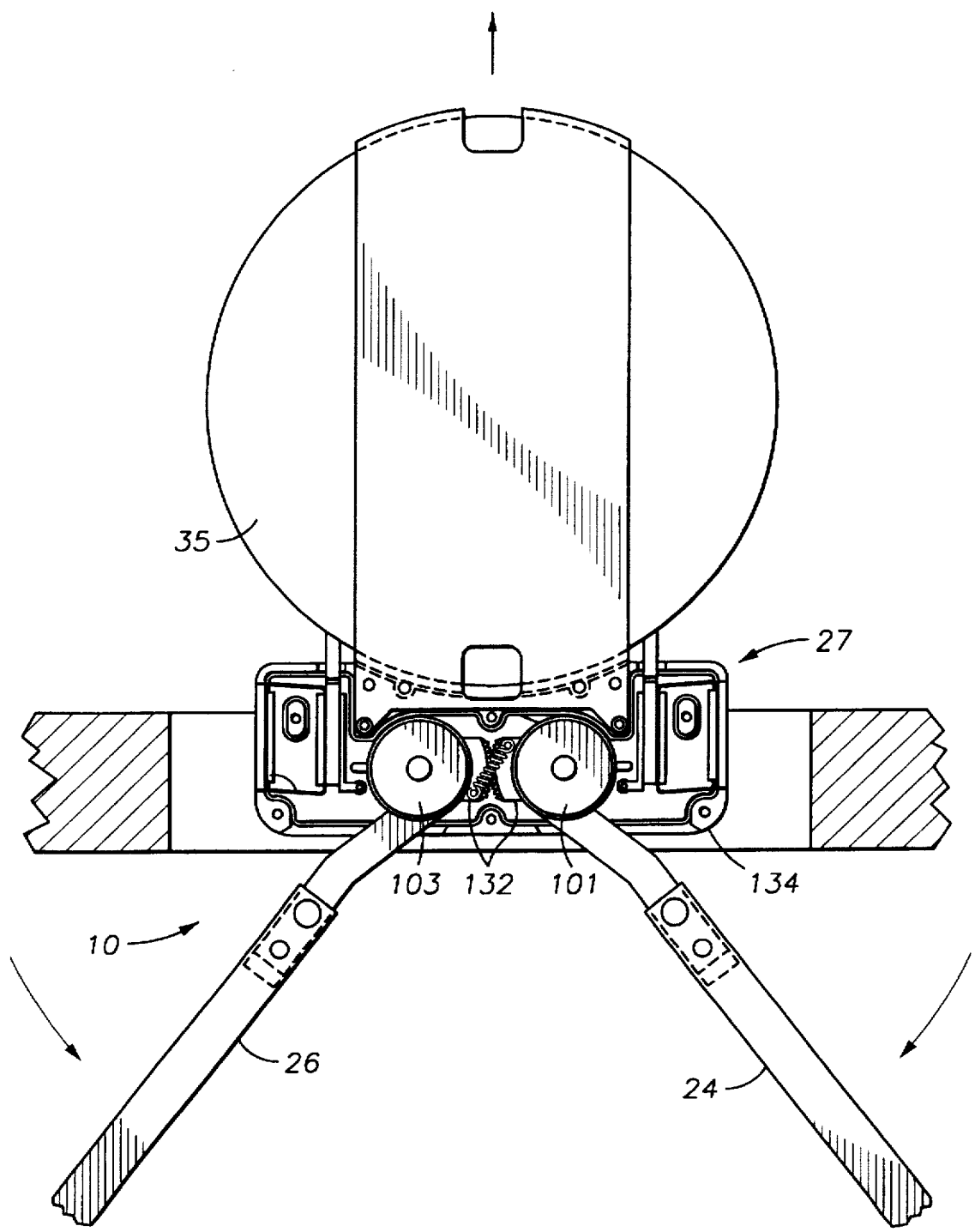
FIG. 9 is a top view of a robot wrist having intermeshed gears.

Referring now to FIG. 9, each of the upper struts 24, 26, as well as the lower struts 28, 30 (not shown), are provided with a pivot 130 on the distal end (blade end) including a toothed, intermeshed gear 132. In this embodiment, a wrist housing 134 is provided into which the ends of the struts 24, 26 extend. The toothed gears of upper struts 24, 26, as well as lower struts 28, 30 (not shown), are intermeshed to provide equal and controlled movement of the blades 35, 37 which are connected to the wrists 27, 29. In this manner the blade always extends radially without wobbling or becoming cocked sideways. Other methods of providing equal and controlled movement of the blades may also be employed within the scope of the present invention.

In the position shown in FIG. 1, the two magnetic rings 14, 16 may be rotated in the same direction to provide rotation to the robot assembly around the axis of rotation within the transfer chamber. In this position, the robot assembly is sufficiently compact to enable rotation of the assembly necessary to service various chambers located on a process system.

Figure 2:
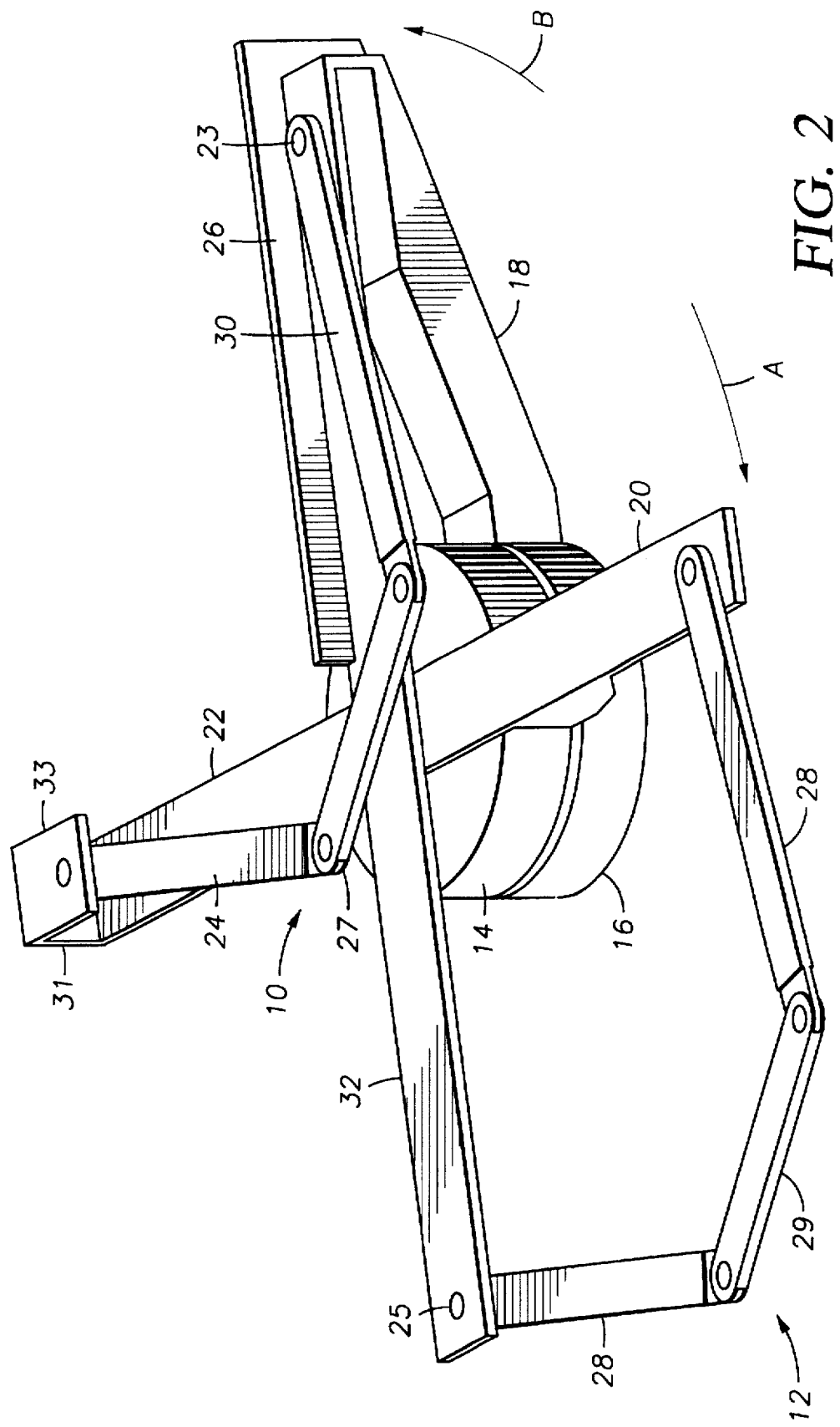
FIG. 2 is a substantially top perspective view showing the lower robot arm of embodiment of FIG. 1 in an extended position.

Referring to FIG. 2, a substantially top perspective view showing extension of the lower arm 12 is provided. In FIGS. 2–5, the blades 35, 37 are not shown in order to more clearly illustrate the robot arms 10, 12. In the configuration shown in FIG. 2, the lower arm 12 is extended by rotating magnetic ring 16 in a clockwise direction (as shown by arrow A) and magnetic ring 14 in a counterclockwise direction (as shown by arrow B). This opposed motion moves the ends of cantilevered arms 20 and 32 from a position 180 degrees opposed to a position approaching 90 degrees, thereby extending struts 28 and 30 into an extended position. Cantilevered arms 18 and 22 are similarly moved from a 180° opposed position to a position more nearly approaching 90° behind the magnetic retaining rings 14, 16 relative to the extension of robot arm 12. In this position the wrist 27 moves a short distance opposite the wrist 29 to position over the magnetic retaining ring 14. The relative amount of motion of each cantilevered arm determines the length of extension and the positioning of each arm can be adjusted to achieve similar results with more or less rotation of the magnetic retaining rings 14, 16. To retract the lower arm 12, the rotation of the magnetic retaining rings is reversed thereby moving cantilevered arms 20, 32 back into a 180° opposed position.

Similarly, to extend upper arm 10, magnetic retaining ring 14 is rotated in a counterclockwise direction and magnetic ring 16 is rotated in a clockwise direction. The opposed motion of the magnetic rings 14, 16 moves the ends of the cantilevered arms 18 and 22 from a 180° opposed position into a more proximal relationship, thereby extending struts 24 and 26 and wrist 27 connected thereto. Robot arm 10 is then retracted when magnetic ring 14 moves in a clockwise direction and magnetic ring 16 moves in a counterclockwise direction, thus returning the cantilevered arms 18, 22 into a 180° opposed position.

Figure 7:
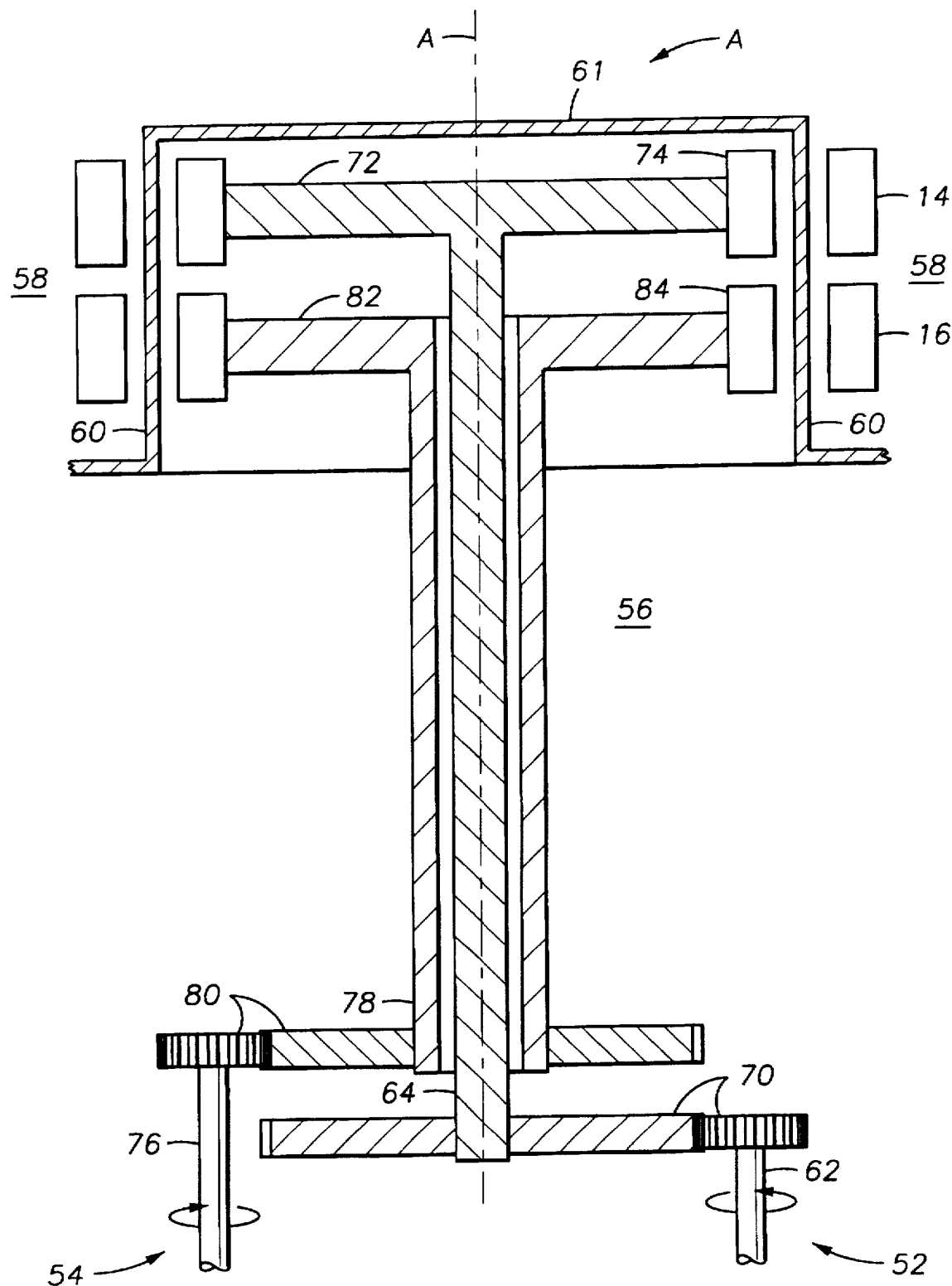
FIG. 7 is a schematic cross sectional view of a magnetic assembly which magnetically couples rotation to two magnetic retaining rings in accordance with the embodiment as illustrated in FIGS. 1 and 2.

Referring to FIG. 7, a cross sectional view of a robot drive system is shown. A magnetic coupling assembly is configured to rotate magnetic retaining rings 14, 16 about a central axis A, thereby providing a drive mechanism to actuate the two blades 35, 37 within the system, both rotationally and linearly. Additionally, the magnetic coupling assembly provides rotational movement of the magnetic retaining rings 14, 16 with minimal contacting moving parts within the vacuum enclosure to minimize particle generation. In this embodiment, the robot features are provided by fixing first and second stepper or servo motors in a housing located above or below the transfer chamber, preferably below, and coupling the output of the motors to magnetic ring assemblies located inwardly of and adjacent to a thin wall 60 of a motor chamber 56. The thin wall 60 is connected to the upper or lower wall of the transfer chamber 58 at a sealed connection to seal the interior of the transfer chamber from the environment outside of the chambers. Magnetic retaining rings 14, 16 are located on the vacuum side of chamber 58, adjacent to and surrounding the thin wall 60.

A first motor output 52 drives shaft 62 and intermeshed gears 70 to provide rotation to the first magnetic ring assembly 72 that is magnetically coupled to a first magnetic retaining ring 14. A second motor output 54 drives shaft 76 and intermeshed gears 80 to provide rotation to the second magnetic ring assembly 82 that is magnetically coupled to a second magnetic retaining ring 16. Rotation of the motor rotor causes rotation of the magnet ring assemblies 72, 82 which magnetically couple the rotary output to magnetic retaining rings 14, 16, thereby rotating the base of each cantilevered arm around the perimeter of the thin wall 60 to impart rotational and translational motion to the blades. The cantilevered arms described above are connected to selected magnetic retaining rings as described to convert magnetically coupled rotational output of the motors into rotational and translational motion of the substrate support blades, preferably within a vacuum environment.

To couple each magnet ring assembly to its respective magnetic retaining ring, each magnet ring assembly 72, 82 and magnetic retaining ring 14, 16 preferably include an equal plurality of magnets paired with one another through wall 60. To increase magnetic coupling effectiveness, the magnets may be positioned with their poles aligned vertically, with pole pieces extending therefrom and toward the adjacent magnet to which it is coupled. The magnets which are coupled are flipped, magnetically, so that north pole to south pole coupling occurs at each pair of pole pieces located on either side of the thin walled section. While magnetic coupling is preferred, direct coupling of the motors to the retaining rings may also be employed.

Figure 3:
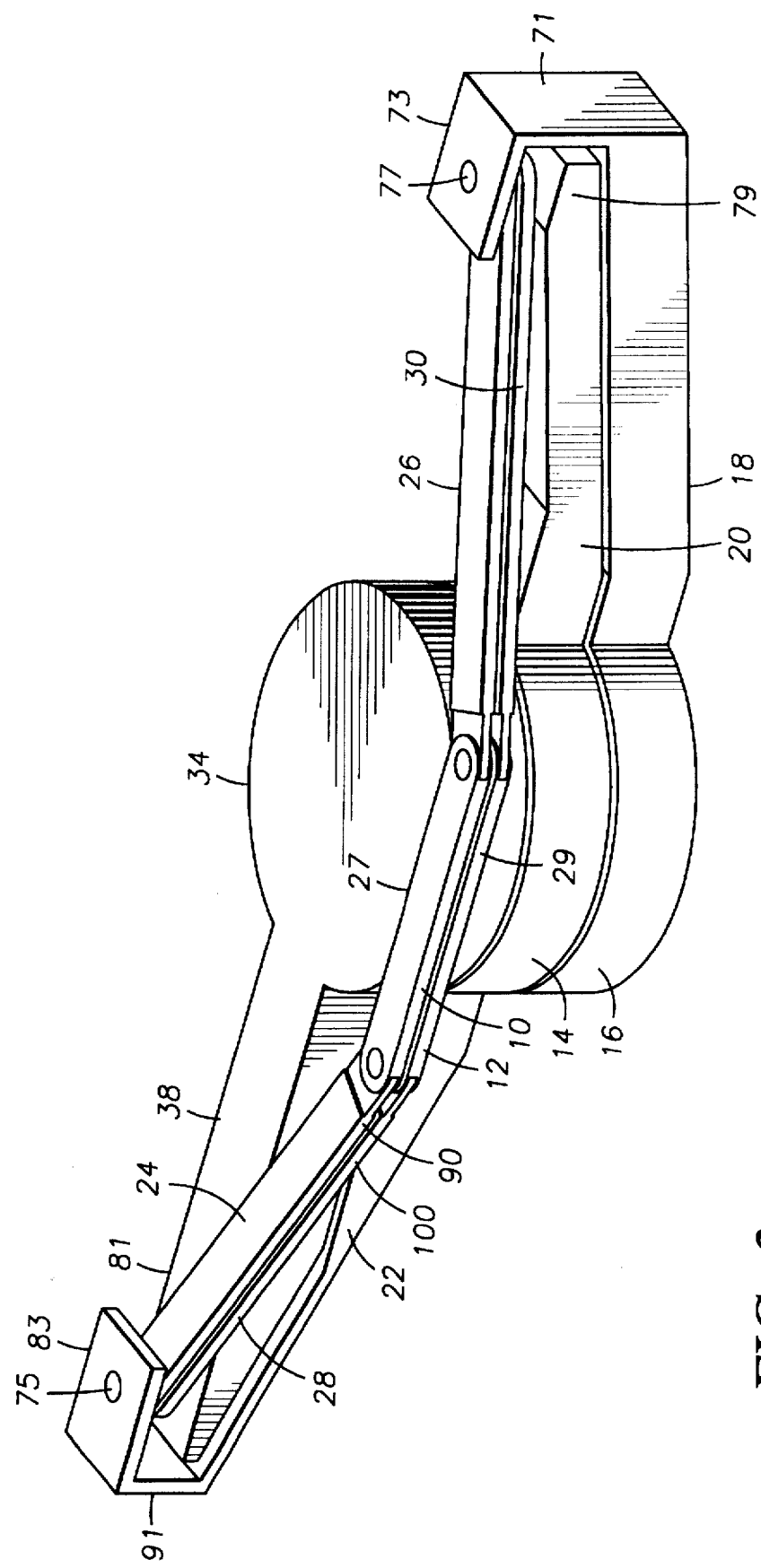
FIG. 3 is a substantially top perspective view of another embodiment of the present invention showing the robot arms in a retracted position.

Referring to FIG. 3, another dual plane robot assembly of the present invention is provided with three magnetic retaining rings which enable the wrists 27, 29 (as well as blades 35, 37 which are not shown) to be more closely spaced to one another by eliminating transverse strut 32 of FIGS. 1 and 2. In this embodiment, an additional magnetic retaining ring 34 provides actuation of strut 28, a function which in the embodiment of FIG. 1 is provided by pivot 25 on transverse strut 32.

The robot assembly is shown in FIG. 3 in the retracted position ready for rotation within the transfer chamber or extension of one of the robot arms 10, 12. Cantilevered arms 18, 20, 22 and 38 extend radially from the retaining rings 14, 16 and 34 to actuate robot arms 10, 12 in a rotational or linear motion. Cantilevered arm 18 extends radially from retaining ring 16 and includes an upwardly extending end portion 71 on which an inwardly extending strut mounting portion 73 is supported. Strut 26 is pivotally connected at one end to the lower surface of the mounting portion 73 and to the wrist 27 at its opposite end. Cantilevered arm 22 extends radially from magnetic retaining ring 14 and includes an upwardly extending end portion 91 from which a strut mounting portion 83 is supported and extends inwardly. Strut 24 is pivotally connected at one end to the lower surface of strut mounting portion 83 and at its other end to wrist 27. Both inwardly extending mounting portions 83, 73 include pivots 75, 77 on the lower surfaces thereof, respectively, to locate struts 24, 26 in the same plane.

Cantilevered arm 20 extends radially from magnetic retaining ring 14 opposite arm 22 and angles upwardly to provide a strut mounting surface 79 at the end thereof. Support strut 30 of lower robot arm 12 is pivotally connected at one end to the mounting surface 79 of arm 20 and at its other end to wrist 29. Cantilevered arm 38 extends radially from magnetic retaining ring 34 opposite cantilevered arm 20 and includes a strut mounting surface 81 which is coplanar with strut mounting surface 79 on cantilevered arm 20. Support strut 28 of lower robot arm 12 is pivotally connected at one end to the mounting surface 81 of arm 38 and at its other end to wrist 29. Extension of lower robot arm 12 is provided by rotation of magnetic retaining rings 14 and 34 in opposed directions.

Figure 4:
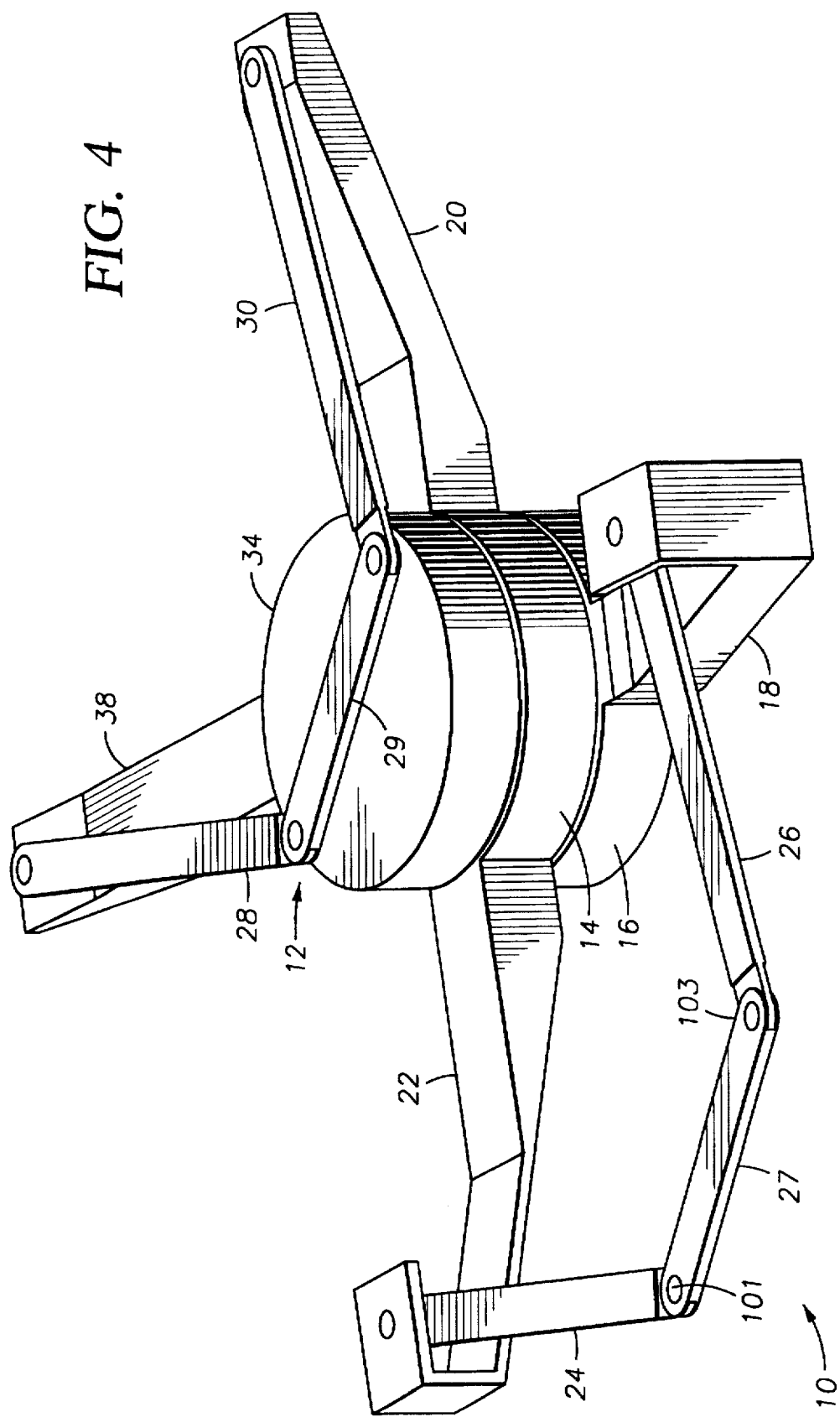
FIG. 4 is a substantially top perspective view of the embodiment shown in FIG. 3 showing the upper robot arm in an extended position.

In operation, retaining ring 14 cooperates with both retaining rings 16 and 34 to drive robot arms 10,12, respectively as shown in FIG. 4. Robot arm 10 is actuated on rotation of retaining rings 16 and 14 in opposite directions, while robot arm 12 is actuated on rotation of retaining rings 14 and 34 in opposite directions.

Referring to the configuration in FIG. 4, arm 10 is extended on rotation of retaining ring 18 a clockwise direction and retaining ring 22 in a counterclockwise direction which moves arms 18, 22 into closer relationship with one another thereby driving co-planar struts 24, 26 into an extended position along with wrist 27. Wrist 27 is preferably pivotally connected on the ends of struts 24, 26 at pivots 101, 103. As arm 10 is extended, struts 28, 30 of robot arm 12 are moved in the opposite direction so that wrist 29 is moved to a position over the magnetic retaining ring 34. To retract the wrist 27, the direction of rotation of the magnetic retaining rings 14, 16 is reversed to move the arms 18, 22 into a 180° opposed position, thereby retracting struts 24, 26 and wrist 27.

Figure 5:
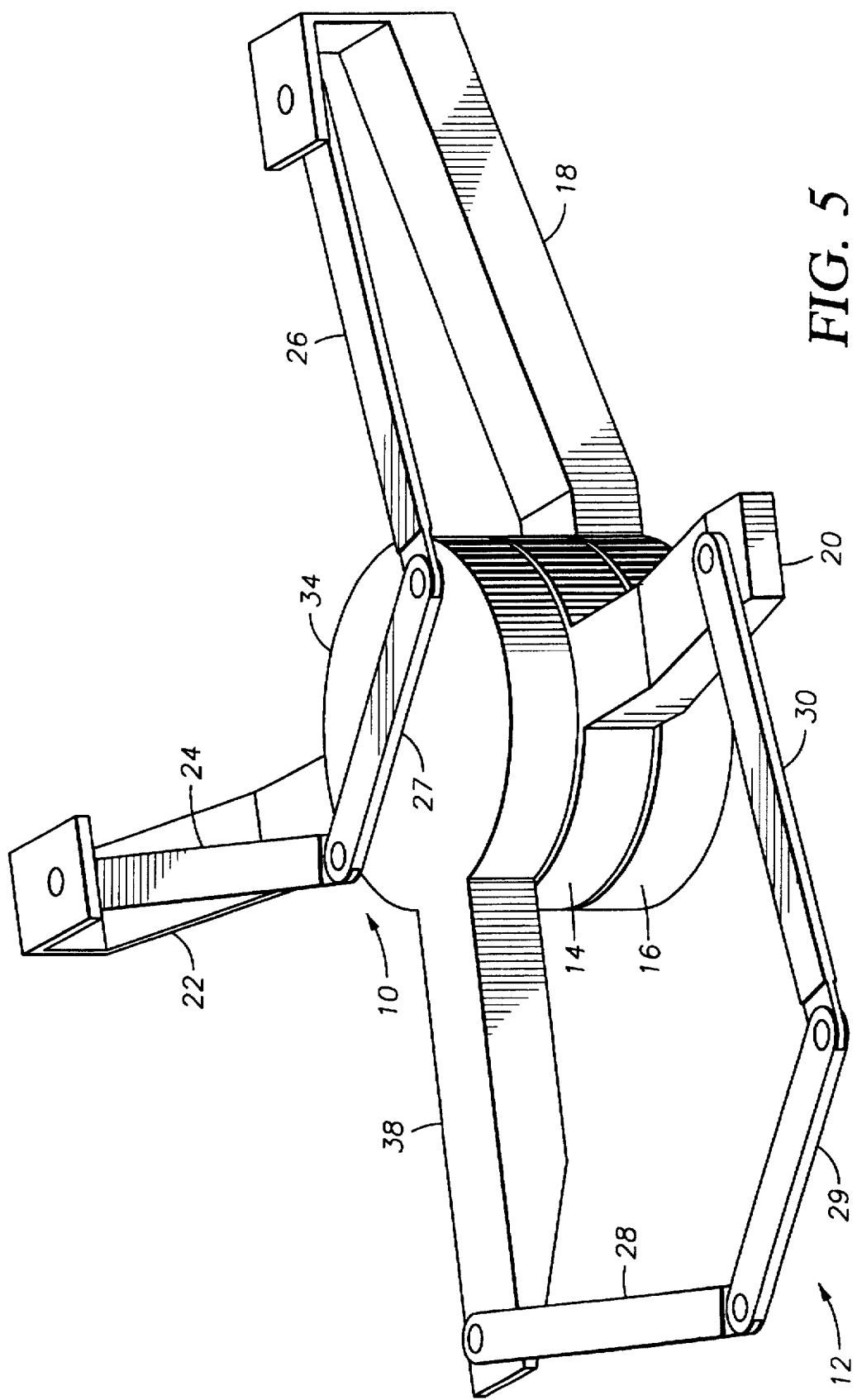
FIG. 5 is a substantially top perspective view of the embodiment of FIGS. 3 and 4 showing the lower robot arm in an extended position.

Referring to FIG. 5, arm 12 is extended on rotation of magnetic retaining ring 14 in a clockwise direction and magnetic retaining ring 38 in a counterclockwise direction to drive co-planar struts 28, 30 into an extended position along with pivotally coupled wrist 29 as the cantilevered arms 20, 38 are moved in closer relationship to one another. As the wrist 29 is extended, wrist 27 is moved slightly in the opposite direction to position the wrist 27 over the magnetic retaining ring 34. To retract the arm 12, the rotation of magnetic retaining rings 14, 38 is reversed. If rotation in this direction continues through the position where both wrists and/or blades are in alignment with one another, the wrist 27 will then be extended and the wrist 27 and blade 35 will be moved over the magnetic retaining ring 34. In this way, a substrate shuttle operation described below can be accomplished.

Figure 6:
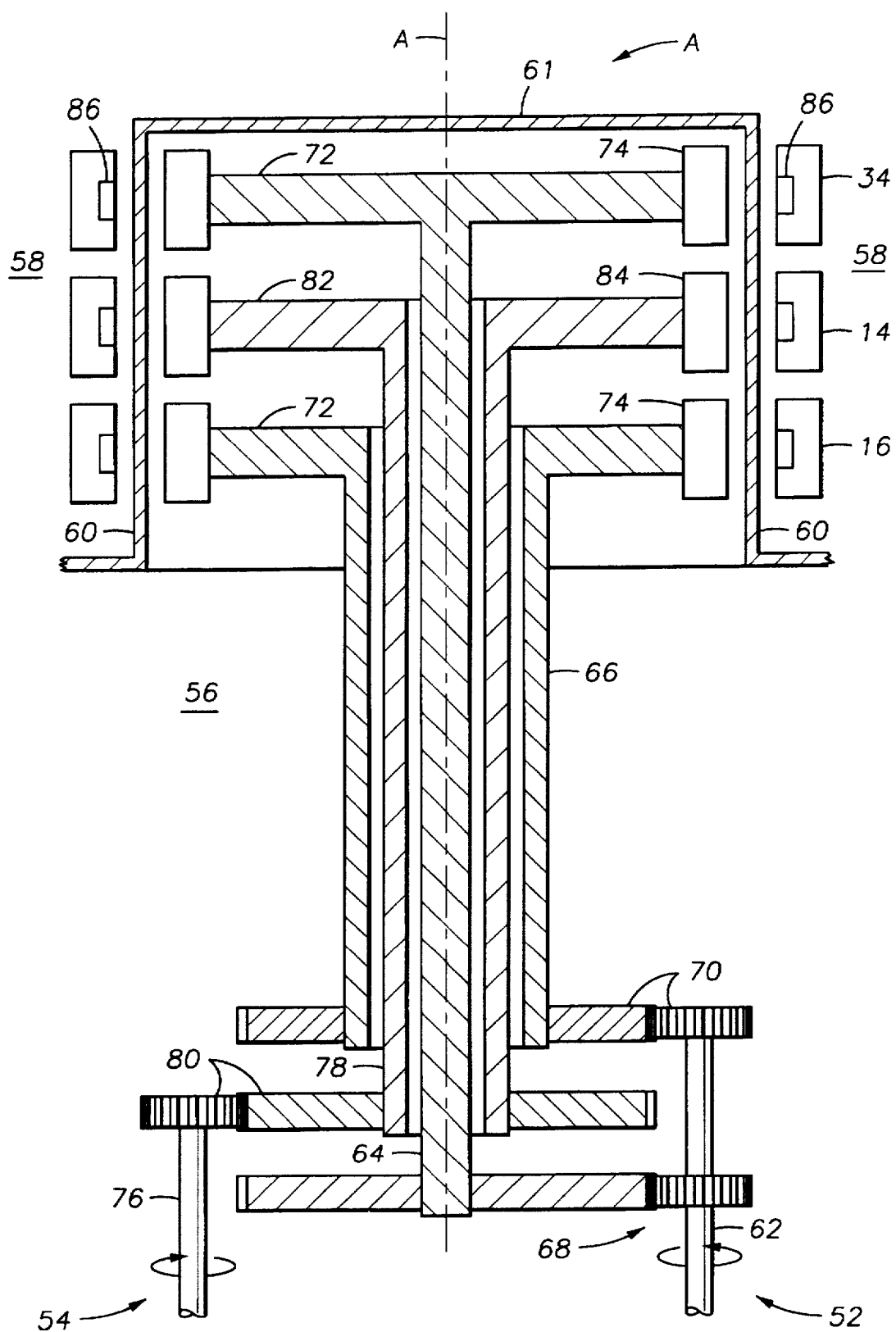
FIG. 6 is a schematic cross sectional view of a magnetic linkage which magnetically couples rotation to three magnetic retaining rings in accordance with the embodiment as illustrated in FIGS. 3–5.

FIG. 6 illustrates a magnetic coupler suitable for magnetically coupling one or more motors 52, 54 from a cylindrical motor chamber 56 into a transfer chamber 58 that radially encircles the cylindrical motor chamber. In this embodiment, motors 52, 54 are preferably electric motors, but any motor may be used such as pneumatic motors, gas-powered motors or any other actuator that can provide rotational movement. A thin sidewall 60 defines the radial extent of motor chamber 56 and top wall 61 defines the vertical extent of motor chamber 56 to enable a pressure difference to exist between the chambers 56 and 58. In this embodiment, chamber 56 is a robot transfer chamber that is used to transfer substrates to and from a set of reaction chambers disposed circumferentially around the transfer chamber. Transfer of a substrate into or out of a selected chamber is achieved by linear, radial extension of a robot arm into and out of the selected chamber.

Motor 52 is coupled to an output shaft 62 to provide power to the robot. Output shaft 62 is coupled to two concentric output shafts 64, 66 by first and second belt or gear drives 68, 70. Concentric output shafts 64, 66 are each attached to a magnet clamp 72 that holds a plurality of magnets 74, each of which is closely spaced from sidewall 60.

Motor 54 is similarly coupled to an output shaft 76 which is coupled to concentric shaft 78 by belt or gear drive 80. Concentric shaft 78 is attached to a magnet clamp 82 that holds a plurality of magnets 84, each of which is closely spaced from sidewall 60. While belt or gear drives are preferred to transfer motion of the actuators to the concentric shafts 64, 66, 78, other type gear or motion assemblies may be used.

Magnetic retaining rings 14, 16, and 34 are located on the transfer chamber side of sidewall 60 and retain a plurality of magnets 86 within the plane of the magnets 74, 84 disposed in the motor chamber 56. A set of bearings enable the magnet retaining rings 14, 16 and 34 to rotate about the motor housing on an axis A. Magnetic retaining rings 16, 34 are both coupled to the motor 52 so that they rotate in the same direction. Rotation of shaft 62 rotates shafts 64, 66 and magnets 74 disposed at the ends thereof. Rotation of magnets 74 magnetically couples rotation of motor 52 to magnetic retaining rings 16, 34. Similarly, rotation of shaft rotates magnets 84 disposed on the ends thereof. Rotation of the magnets 84 magnetically couples rotation of the motor 54 to magnetic retaining ring 14.

The linkages described above can be used to advantage to perform a substrate shuttle operation, thereby reducing dead time and increasing throughput. To achieve this advantage, the robot assembly can be rotated to position the arms 10, 12 in alignment with a selected chamber. A fresh substrate is located on either the lower or upper blade 35, 37. The vacant blade is then inserted into the selected chamber and a substrate which has been processed in the chamber is located on the blade for removal from the chamber. The processed substrate is removed from the chamber. The robot arm on which the fresh substrate is positioned is then extended into the chamber to position the fresh substrate over the support member to be located thereon for processing. Once the substrate shuttle operation has been performed, the processed substrate can be moved to another location within the process system and another substrate can be retrieved for transport through the system.

Figure 8:
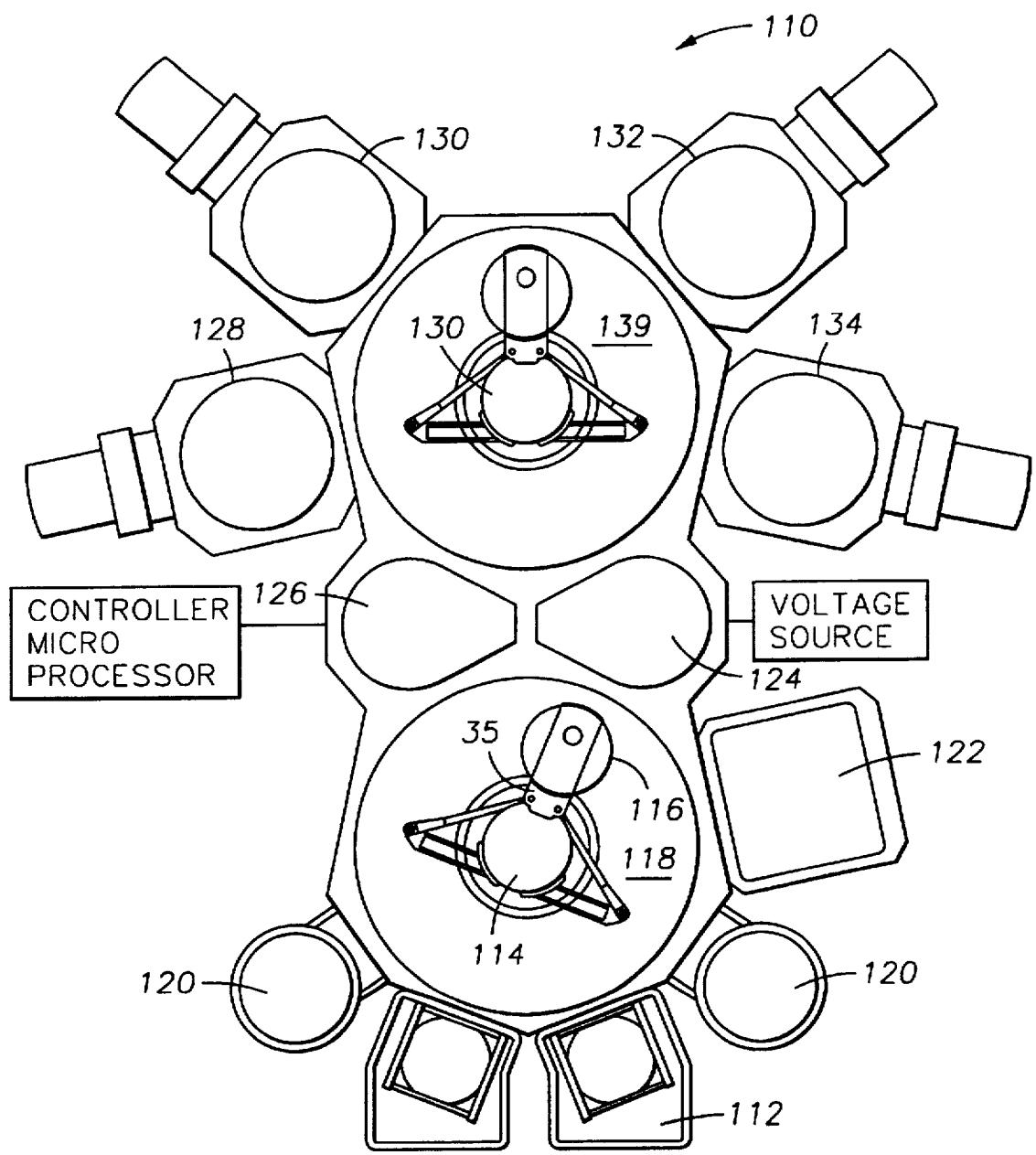
FIG. 8 is a schematic top view of a process system including a robot.

Now referring to FIG. 8, a schematic top view of a process system 110 including a robot is shown. A robot 114 of the present invention can be incorporated into a transfer chamber 118 of a cluster tool to allow more rapid transfer of wafers 116 from one location to another.

Modern semiconductor processing systems include cluster tools that integrate a number of process chambers together in order to perform several sequential processing steps without removing the substrate from the highly controlled processing environment. These chambers may include, for example, degas chambers, substrate preconditioning chambers, cooldown chambers, transfer chambers, chemical vapor deposition chambers, physical vapor deposition chambers, and etch chambers. The combination of chambers in a cluster tool, as well as the operating conditions and parameters under which those chambers are run, are selected to fabricate specific structures using a specific process recipe and process flow.

Once the cluster tool has been set up with a desired set of chambers and auxiliary equipment for performing certain process steps, the cluster tool will typically process a large number of substrates by continuously passing them, one by one, through the same series of chambers or process steps. The process recipes and sequences will typically be programmed into a microprocessor controller that will direct, control and monitor the processing of each substrate through the cluster tool. Once an entire cassette of wafers have been successfully processed through the cluster tool, the cassette may be passed to yet another cluster tool or stand alone tool, such as a chemical mechanical polisher, for further processing.

Referring again to FIG. 8, a schematic diagram of an exemplary integrated cluster tool 110 is shown. Substrates 116 are introduced into and withdrawn from the cluster tool 110 through a cassette loadlock 112. A robot 114 of the present invention having an upper blade 35 is located within the cluster tool 110 to transfer the substrates from one process chamber to another, for example cassette loadlock 112, a degas wafer orientation chamber 120, preclean chamber 124, PVD TiN chamber 122 and cooldown chamber 126. The robot blade 35 is illustrated in the retracted position for rotating freely within the chamber 18.

A second robot 130 is located in transfer chamber 134 to transfer substrates between various chambers, such as the cooldown chamber 126, PVD Ti chamber 128, PVD TiN chamber 130, CVD Al chamber 132, and a PVD AlCu processing chamber 134. The specific configuration of the chambers in FIG. 8 is merely illustrative and comprises an integrated processing system capable of both CVD and PVD processes in a single cluster tool. In a preferred aspect of the invention, a microprocessor controller is provided to control the fabricating process sequence, conditions within the cluster tool and operation of the robots.

While the foregoing is directed to the preferred embodiment of the present invention, other and further embodiments of the invention may be devised without departing from the basic scope thereof. The scope of the invention is determined by the claims which follow.

We claim:

1. An apparatus for transferring objects, comprising:
   a first motor coupled to a first rotatable member that is rotatable about an axis of rotational symmetry;
   a second motor coupled to a second rotatable member that is rotatable about an axis of rotational symmetry;
   a plurality of blades vertically spaced from one another; and
   a linkage to enable coordinated movement of the blades on rotation of the first and second rotatable members.

2. The apparatus of claim 1, wherein the coordinated movement of the blades includes simultaneous extension and retraction.

3. The apparatus of claim 1, wherein rotation of the first and second rotatable members in the same direction provides rotation of the blades.

4. The apparatus of claim 1, wherein rotation of the first and second rotatable members in the opposite direction provides extension of the one blade and retraction of the other blade.

5. The apparatus of claim 1, wherein the rotatable members have a common axis.

6. The apparatus of claim 1 wherein the blades are extended and retracted on rotation of the rotatable members in opposite directions.

7. The apparatus of claim 1 wherein the linkage comprises a first arm assembly and a second arm assembly, each arm assembly coupled to the first and second motors.

8. The apparatus of claim 7 wherein each arm assembly is magnetically coupled to the first and second motors.

9. The apparatus of claim 7 wherein each arm assembly comprises a first and second strut pivotally connected to a blade.

10. The apparatus of claim 9 wherein a first strut is driven by a first rotatable member and a second strut is driven by a second rotatable member.

11. The apparatus of claim 1 wherein the linkage comprises:
- a first drive member extending from a first rotatable member, the first drive member supporting a transverse strut having first and second pivots located on either side of the axis of rotation; and
- a second and third drive member extending from the second rotatable member, each of the second and third drive members having third and fourth pivots located thereon.

12. The apparatus of claim 11 wherein the transverse strut is pivotally coupled at the pivots to a strut of each arm assembly and second and third drive members are pivotally coupled to the other strut of an arm assembly.

13. The apparatus of claim 1 wherein the second rotatable member is rotatable about the same axis of rotation as the first rotatable member.

14. An apparatus for transferring objects between multiple positions, comprising:
- a) a first arm assembly having a first blade connected thereto, the first blade disposed on a first plane;
- b) a second arm assembly having a second blade connected hereto, the second blade disposed on a second plane; and
- c) a drive member coupled to each of the first and second arm assemblies to actuate each arm assembly.

15. The apparatus of claim 14 wherein the first and second arm assemblies are actuated by rotation of two coaxially aligned hubs.

16. The apparatus of claim 14 wherein the first and second arm assemblies are actuated by rotation of three coaxially aligned hubs.

17. The apparatus of claim 16 wherein the three coaxially aligned hubs are actuated by two motors.

18. The apparatus of claim 14 wherein the drive member includes two motors.

19. The apparatus of claim 18 wherein each one of the two motors is magnetically coupled to the first arm assembly and the other of the two motors is magnetically coupled to the second arm assembly.

20. The apparatus of claim 16 wherein the three coaxially aligned hubs include a top, middle and bottom hub, and wherein the top and bottom hub are actuated by the same motor.

21. The apparatus of claim 20 wherein the top and bottom hub are always rotated in the same direction.

22. A method for transferring substrates between a plurality of positions within an enclosure, comprising the steps of:
- a) providing a first transfer assembly having a substrate support occupying a first plane and positionable at multiple positions about an axis of rotation;
- b) providing a second transfer assembly having a substrate support occupying a second plane and positionable at multiple positions about the axis of rotation;
- c) coaxially positioning the first and the second transfer assemblies about the axis of rotation; and
- d) moving the first and second transfer assemblies by rotating a plurality of hubs with a drive assembly.

23. The method of claim 22 wherein the step of moving the first and second transfer assemblies comprises driving first and second transfer assemblies with first and second motors.

24. An apparatus for transferring an object through an enclosure, comprising:
- a first extendable arm assembly comprising:
  - a first drive arm movable about a central axis;
  - a second drive arm movable about the central axis;
  - a pair of strut arms movably connected to the first and second drive arms;
  - a substrate transfer blade pivotally coupled to the pair of strut arms;
- a second extendable arm assembly comprising:
  - a third drive arm movable about the central axis;
  - a fourth drive arm movable about the central axis;
  - a pair of strut arms movably connected to the third and fourth drive arms; and
  - a substrate transfer blade pivotally coupled to the pair of strut arms; and
- a drive assembly coupled to the first and second extendable arm assemblies to provide rotational and translational motion to the arm assemblies.

25. The apparatus of claim 24 wherein the drive assembly comprises two motors.

26. The apparatus of claim 25 wherein the two motors are magnetically coupled to a plurality of drive hubs which support the drive arms.

27. The apparatus of claim 26 further comprising two drive hubs to magnetically couple rotational motion of the two motors to the blades.

28. The apparatus of claim 27 further comprising three drive hubs to magnetically couple rotational motion of the two motors to the blades.

29. A robot linkage to impart rotational and linear motion to at least two multi-plane transfer blades, comprising:
- a) first and second drive arms coupled to a first blade by a pair of strut arms;
- b) third and fourth drive arms coupled to a second blade by a second pair of strut arms;
- c) first and second drive hubs coupled to the drive arms to impart rotational and linear motion to the first and second blades.

30. The robot linkage of claim 29 further comprising a third hub to impart rotational and linear motion to the first and second blades.

31. The robot linkage of claim 30 wherein two of the hubs are coupled together.

32. A multi-chamber process system, comprising:
- a) at least one transfer chamber;
- c) a plurality of process chambers connected to at least one transfer chamber; and
- d) a robot comprising:
  - i) a first motor coupled to a first rotatable member that is rotatable about an axis;
  - ii) a second motor coupled to a second rotatable member that is rotatable about an axis;
  - iii) a plurality of object supports vertically spaced from one another, and a linkage to enable coordinated movement of a plurality of blades on rotation of the first and second rotatable members.

33. The system of claim 32, wherein the coordinated movement of the blades includes simultaneous extension and retraction.

34. The system of claim 32, wherein rotation of the first and second rotatable members in the same direction provides rotation of the blades.

35. The system of claim 32, wherein rotation of the first and second rotatable members in the opposite direction provides extension of the one blade and retraction of the other blade.

36. The system of claim 32, wherein the rotatable members have a common axis.

37. The system of claim 32, wherein the blades are extended and retracted on rotation of the rotatable members in opposite directions.

38. The system of claim 32, wherein the linkage comprises a first arm assembly and a second arm assembly, each arm assembly coupled to the first and second motors.

39. The system of claim 38, wherein each arm assembly is magnetically coupled to the first and second motors.

40. The system of claim 38, wherein each arm assembly comprises a first and second strut pivotally connected to a blade.

41. The system of claim 40, wherein a first strut is driven by a first rotatable member and a second strut is driven by a second rotatable member.

42. The system of claim 32, wherein the linkage comprises:

a first drive member extending from the first rotatable member, the first drive member supporting a transverse strut having first and second pivots located on either side of the axis of rotation;

a second and third drive member extending from the second rotatable member, each of the second and third drive members having a pivot located thereon.

43. The system of claim 42, wherein the transverse strut is pivotally coupled at the pivots to a strut of each arm assembly and second and third drive members are pivotally coupled to the other strut of an arm assembly.

44. The system of claim 32, wherein the second rotatable member is rotatable about the same axis of rotation as the first rotatable member.

45. An apparatus for transferring objects, comprising:

a first magnetic coupling that magnetically couples a first motor to a first rotatable member;

a second magnetic coupling that magnetically couples a second motor to a second rotatable member;

a plurality of blades vertically spaced from one another; and a linkage to enable coordinated movement of the blades on rotation of the first and second rotatable members.

* * * * *